United States Patent Office 3,357,819
Patented Dec. 12, 1967

3,357,819
PREPARATION OF HOMOGENEOUS POWDERS COMPOSED OF ULTRAFINE PARTICLES
Arne Landsberg, San Jose, Costa Rica, assignor to the United States of America as represented by the Secretary of the Interior
No Drawing. Filed Mar. 16, 1966, Ser. No. 536,584
11 Claims. (Cl. 75—.5)

This invention relates to the production of powders composed of particles containing metal values.

An interest in powders composed of ultrafine particles containing metal values has been stimulated by the desire to prepare homogeneous alloys by powder metallurgy processes and to develop high strength metals through dispersion modification which involves dispersing certain metal oxides such as thoria in the matrix of other metals such as nickel.

Conventional methods (e.g., grinding, arc vaporization and vapor phase reduction) of preparing ultrafine powders containing metal values require lengthy preparation periods, special equipment, special handling techniques and are unsatisfactory in producing homogeneous mixtures of these ultrafine particles. More simplified procedures have been employed wherein a powder is prepared by evaporation of a liquid solution of metal values (e.g., U.S. Patent No. 2,893,859). However, powders prepared by this process are dense and are not ultrafine. Such a product is not highly suitable for later metallurgical-type reduction and sintering treatments.

The object of the present invention is to provide a simplified method for making ultrafine particles containing metal values which can be readily and conveniently subjected to further metallurgical-type treatments such as reduction and sintering.

For a more detailed understanding of the invention reference is to be had to the following description.

A liquid dispersion is first prepared by dispersing metals or metal compounds in a liquid dispersing medium. The term "dispersion" as used throughout the specification and claims means a solution or colloidal dispersion. As an example of this first step, in the production of a tungsten-containing powder, an ammonium tungstate solution is prepared by dissolving tungstic acid in dilute ammonium hydroxide. Heat may be necessary for complete dispersion in many instances. The resulting dispersion is then rapidly, completely frozen, for example, by dripping the dispersion into liquid nitrogen; or dripping the dispersion onto a metal plate cooled by a Dry Ice and acetone mixture; or swirling the liquid in a cold walled, round bottomed container whereby the liquid rapidly freezes in the form of a thin shell on the inner surface of the container. The frozen dispersion of organic or inorganic salts and other compounds, as the case may be, is then placed under high vacuum and the main body of dispersing medium removed therefrom by sublimation. A commercial freeze-drying unit may be employed for this purpose. In some cases the freeze-dried material falls into powder when dry, while in others it retains the shape of the frozen mass. Such a mass is readily broken into powder form. Freeze-dried ammonium tungstate maintains the size and shape of the frozen solution; however, it is easily broken into talcum-powder consistency.

Freeze-dried powders produced by the process are not only intimately mixed on a molecular scale, but the particles maintain the homogeneous character of the dispersions from which they were prepared. In fact, the particles have been observed to retain the same shape and size as the particles in the frozen dispersion.

Since the process involves sublimation of a frozen dispersion, the dispersing mediums employed must have appreciable vapor pressures below their freezing points. Examples of mediums that form dispersions with many metal compounds and metals, and are suitable for sublimation are acetic acid, camphor, carbon tetrachloride, water, ammonia, molten ferric chloride, and molten magnesium.

Any metal may be formed as a powder constituent by the process of this invention, if the metal or a compound thereof is capable of being dispersed in sublimation-suitable dispersing mediums. Any metal may be combined with other metal or metals to form a powdered alloy if the metals or compounds thereof are mutually soluble in a suitable dispersing medium. Many compounds of the following metals are capable of being dispersed in sublimation-suitable dispersing mediums: Copper, silver, gold, vanadium, tungsten, chromium, molybdenum, rhenium, iron, cobalt, nickel, manganese, platinum, ruthenium, osmium, rhodium, iridium, palladium, platinum, zirconium, hafnium, titanium, beryllium, thorium, some of the rare earths, some of the alkaline earths, and some of the transuranic elements.

Consideration must be given to the particular starting materials that are to be added to the liquid dispersing medium to form a dispersion, when it is desired to subject the resultant powder product to subsequent treatment such as metallurgical-type reduction and/or sintering. For example, any metal compound starting material could be used that yields a powder product which can be decomposed on heating in such a manner that unwanted decomposition products will volatilize. Any compound could be used that yields a powder product that can be freed of unwanted by-products by low temperature oxidation. Also, any compound which forms unwanted products in the powder product that can be separated during hydrogen reduction could be used. Further, if it is desired to reduce the powder product, the metal compounds should be selected so that the powder product is one that may be reduced by methods which do not alter greatly the homogeneity or particle size of the product. The following compounds are exemplary of raw materials that can be used in the freeze-drying process of the present invention to produce powders that may be subjected to reduction and heat treatments to yield highly desirable end products:

(1) metal halides such as chlorides which reduce to give HCl and pure metal;

(2) organometallic compounds such as carbonyls, lactates, acetates which oxidize to metal oxides plus carbon dioxide or carbon monoxide when heated in oxygen or air;

(3) metal nitrates which decompose upon heating into metal oxides and nitrogen oxides.

Concentrations of the liquid dispersions vary with the metal or metal compound to be dispersed. Dilute dispersions are satisfactory, and the only lower limit of concentration is the expense and time required to handle the large volumes of dilute dispersions and the excessive time required to remove the dispersing medium from the frozen dispersion.

Once the dispersion is frozen, it must be prevented from remelting since this causes crystal growth, precipitation of larger particles and segregation in the concentrated liquid resulting from the melting, which action subsequently leads to inhomogeneous powder products after drying.

If a dispersion containing a desired compound or compounds is frozen rapidly enough to prevent precipitation of the dispersoid and if there is no melting during sublimation of the frozen fluid, the resulting material from which the dispersing medium has been removed should retain the state of sub-division and degree of homogeneity of the original dispersion.

Ultrafine powders containing metal values, resulting from the process of this invention, may be reduced to basic metal powders in many cases by passing a reducing agent such as hydrogen in contact with the powder under elevated temperatures. Reductant may be dispersed in the dispersion prior to freezing and subsequently activated after preparation of the powder. Reduction treatment may be employed to prepare dispersion modified metallic powders by: (1) forming, in a liquid dispersion, as a dispersoid a compound of a first metal which forms oxides that are not easily reduced (e.g., zirconium, hafnium, uranium, titanium, beryllium or thorium) along with the compound (or metals) of a second metal which forms readily reducible compounds (e.g., nickel, molybdenum or tungsten), at least the compound of the first metal being readily converted to the metal oxide by, for example, oxidation or heat decomposition; (2) subjecting the powder product to, for example, heat decomposition or oxidation to convert the compound of the first metal to a metal oxide; (3) then subjecting the metal oxide-containing powder product to reduction whereby the difficult-to-reduce metal oxide consequently exists as a solid metal oxide dispersoid in the solid, substantially basic metal matrix of the second metal (or metals). Obviously, if the first metal can initially be dispersed in the liquid dispersing medium in the oxide form, the conversion-to-oxide step would not be necessary. A solution prepared by dissolving zirconium lactate or glycolate in an ammonium tungstate solution is an example of a liquid dispersion that can ultimately be converted to a dispersion modified basic metal powder.

If the desired end product is a ceramic article, the powder product of the process of this invention may be subject to sintering densification. Whichever subsequent treatment is employed, due care should be exercised to prevent particle growth.

The following table (1) illustrates the effect of dispersion concentrations on the particle size of the powder product of the present invention, (2) compares this product with a powder prepared by rotary evaporation of the solution (e.g., the process of U.S. Patent No. 2,893,859), and (3) shows the effect of different reduction procedures on the particle size of the original product:

TREATMENT OF AMMONIUM TUNGSTATE SOLUTIONS
[Particle size in angstroms—determined by X-ray diffraction]

| Tungsten Concentration of Solution (g./cc.) | I | II | III | IV | V |
| --- | --- | --- | --- | --- | --- |
| .01 | 500 | 20 | 450 | 270 | 38 |
| .02 | ---- | 30–50 | 300 | ---- | 48 |
| .05 | ---- | 30–50 | 240 | 250 | -- |
| .10 | 1,000 | 30–50 | 450 | 250 | 60 |

Column I—Dried by rotary evaporation; reduced [1] by hydrogen at 250° C. for 2 hrs. and then at 700° C. for 4 hrs.
Column II—Freeze-dried by dripping onto plate cooled by nitrogen to yield $(NH_4)_2WO_3 + H_2O$, and sublimed in small (5 to 6 quart capacity) commercial freeze-drying unit; the water removed by sublimation at pressures ranging from 50 to 100 microns mercury (since the solutions were stable only short periods of time, with a precipitate tending to form at room temperature after ½ hour, it was necessary to freeze the solutions as soon as they were prepared).
Column III—Product of Column II reduced [1] by hydrogen at 700° C. for 6 hours.
Column IV—Product of Column II reduced [1] by hydrogen at 250° C. for 4 hours and then at 400° C. for 3 hours.
Column V—Product of Column II reduced [2] by hydrogen and hexamine vapor at 400° C. for 3 hours.

[1] Carried out by passing hydrogen, at 100 cc./min., through a Vycor tube in a tube furnace; a small boat in the center of the holding the powder.
[2] Same procedure as 1 but further including placing granular hexamine near tube inlet; as reduction proceeded, tube inlet was advanced into furnace thereby vaporizing hexamine into hydrogen gas stream.

Inspection of the above table shows that removal of water by evaporation followed by hydrogen reduction does not yield an ultrafine powder. Further, this table shows that the smallest particle size material was obtained by freeze-drying of the most dilute beginning solution. The data also shows that low temperatures during initial stages of reduction tend to produce finer metal particles. Hexamine materially aided in rapid low temperature reduction as evidenced by the extremely small sized powders formed in Column V.

The following example illustrates the preparation of a powder composed of metal-containing particles which is subsequently reduced to a metal powder containing 75% tungsten and 25% rhenium.

*Example*

(1) 102 grams of $H_2WO_4$ were added to 500 cc. of $H_2O$ containing 75 cc. of reagent grade $NH_4OH$. The solution was heated gently until clear and then filtered through a coarse fritted glass filter. An aqeous solution of $Re_2O_7$ was added in an amount sufficient to give the equivalent of 25% rhenium with respect to the total metal present.

(2) After separating the solution into two lots, the first lot was cooled to room temperature and poured slowly into glass trays cooled by a Dry Ice and acetone bath. Liquid nitrogen was added to the trays to speed the freezing process. Frozen solution was then freeze-dried by vacuum sublimation at from 50 to 100 microns of mercury pressure. Segregation of tungsten and rhenium was noted in the product.

(3) More rapid freezing of the second lot of the solutions was achieved by adding drops of liquid solution onto an aluminum surface cooled by a Dry Ice and acetone mixture. Frozen solution was broken into thin plates approximately 1/16 inch thick by a sharp rap with a hammer. The plates were transferred into precooled containers and then freeze-dried in the preceding manner. Only minor segregation was noted in the freeze-dried product.

(4) Metallurgical reductions of the powder product formed as a result of freeze-drying both lots of solutions were carried out in Vycor tubes with hydrogen at 200° C. for 30 minutes followed by 300° C. for 1 hour and then 800–900° C. for 2 hours. Initial low temperatures were necessary to prevent premature volatilization of rhenium compounds which would result in the formation of inhomogeneous alloy powders.

Although the composition of alloy powder prepared from the first lot of solutions was close to the desired 75% tungsten-25% rhenium, the powder material was not homogeneous but consisted of coarse particles containing 16% rhenium and fine material (200 mesh) containing 30% rhenium as a result of segregation during freezing. The more rapidly frozen second lot, with only minor segregation during freezing, yielded a more homogeneous end product.

Powders produced by the simplified process of the invention are of closely controlled composition and are highly suitable for subsequent metallurgical-type treatment. Further, the small particle size of the product enables subsequent reduction treatments to be carried out at lower temperatures thereby affording less crystal growth in the particles.

While the particle process herein described is well adapted to carry out the objects of the present invention, it is to be understood that various modifications and changes may be made all coming within the scope of the following claims.

What is claimed is:
1. A method for producing a homogeneous powder composed of ultrafine particles wherein each particle contains metal values comprising
   (a) forming a homogeneous liquid dispersion comprised of metal values dispersed in a liquid dispersing medium, said metal values selected from the group consisting of a metal, mixtures of metals, a metal compound, mixtures of metal compounds, and mixtures of any of these metal values, said dispersion selected from the group consisting of solutions and colloidal dispersions, said dispersing medium having an appreciable vapor pressure below its freezing point so that it is susceptible to vaporization by sublimation under high vacuum;

(b) freezing said dispersion rapidly enough to substantially prevent precipitation of dispersoid, thereby forming a frozen dispersion;

(c) subjecting said frozen dispersion to a high vacuum while substantially preventing remelting of said frozen dispersion, said vacuum being high enough to cause sublimation of said dispersing medium and removal of the dispersing medium from said frozen dispersion thereby forming a powder composed of ultrafine particles wherein each particle contains metal values.

2. The process of claim 1 wherein said dispersion is comprised of metal values of only one metal dispersed in said liquid dispersing medium whereby said powder product is composed of particles containing metal values of only said one metal.

3. The process of claim 1 wherein said dispersion is comprised of metal values of at least two different metals dispersed in said liquid dispersing medium whereby said powder product is composed of particles wherein each particle contains metal values of said at least two different metals.

4. The process of claim 2 wherein the metal value dispersed in said liquid dispersing medium is a readily reducible metal compound.

5. The process of claim 4 further comprising subjecting said powder product to reduction treatment to form a powder composed of particles each containing said metal in substantially basic form.

6. The process of claim 3 wherein the metal values dispersed in said liquid dispersing medium are readily reducible metal compounds of a plurality of metals.

7. The process of claim 6 further comprising subjecting said powder product to reduction treatment to form a powder composed of particles each containing an alloy of said metals.

8. The process of claim 3 wherein said dispersion is comprised of metal values of only two different metals dispersed in said liquid dispersing medium, wherein one of the metal values is an oxide of a first metal which forms difficult-to-reduce oxides and the other metal value is a compound of a second metal which forms readily reducible compounds, and further comprising subjecting said powder product to reduction treatment to form a powder composed of particles each containing said metal oxide dispersed in a metal matrix of said second metal.

9. The process of claim 3 wherein said dispersion is comprised of metal values of more than two different metals dispersed in said liquid dispersing medium, wherein one of the metal values is an oxide of a first metal which forms difficult-to-reduce oxides and the other metal values are compounds of other metals which form readily reducible compounds, and further comprising subjecting said powder product to reduction treatment to form a powder composed of particles each containing said metal oxide dispersed in an alloy matrix of said other metals.

10. The process of claim 3 wherein said dispersion is comprised of metal values of only two different metals dispersed in said liquid dispersing medium, wherein one of the metal values is a compound of a first metal which forms difficult-to-reduce oxides and the other metal value is a compound of a second metal which forms readily reducible compounds, at least the compound of said first metal being readily converted to a metal oxide, and further comprising subjecting said powder product first to a treatment for converting the compound of said first metal to a metal oxide and then to a reduction treatment to form a powder composed of particles each containing said metal oxide dispersed in a metal matrix of said second metal.

11. The process of claim 3 wherein said dispersion is comprised of metal values of more than two different metals dispersed in said liquid dispersing medium, wherein one of the metal values is a compound of a first metal which forms difficult-to-reduce oxides and the other metal values are compounds of other metals which form readily reducible compounds, at least the metal compound of said first metal being readily converted to a metal oxide, and further comprising subjecting said powder product first to a treatment for converting the compound of said first metal to a metal oxide, and then to a reduction treatment to form a powder composed of particles each containing said metal oxide dispersed in a metal alloy matrix of said other metals.

No references cited.

DAVID L. RECK, *Primary Examiner.*

W. W. STALLARD, *Assistant Examiner.*